US006153047A

United States Patent [19]

Gunasekera et al.

[11] Patent Number: 6,153,047

[45] Date of Patent: Nov. 28, 2000

[54] PAGE BINDING METHOD AND MACHINE

[75] Inventors: Frank Bernard Gunasekera, St. Cloud; David Jon Thomsen, Sauk Rapids, both of Minn.

[73] Assignee: The Antioch Company, St. Cloud, Minn.

[21] Appl. No.: 09/012,670

[22] Filed: Jan. 23, 1998

[51] Int. Cl.[7] .............................. B32B 31/20; B42C 9/00

[52] U.S. Cl. .............................................. 156/463; 156/461

[58] Field of Search .................................... 156/212, 211, 156/461, 463

[56] References Cited

U.S. PATENT DOCUMENTS

| | | | |
|---|---|---|---|
| 1,776,255 | 9/1930 | Frontz . | |
| 2,761,487 | 9/1956 | Ware, Jr. | 154/1.6 |
| 2,772,717 | 12/1956 | Ware, Jr. | 154/1.6 |
| 3,135,644 | 6/1964 | Coplen et al. | 161/101 |
| 3,620,882 | 11/1971 | Chou et al. | 156/461 |
| 3,735,516 | 5/1973 | Wenstrom | 40/104.18 |
| 4,129,471 | 12/1978 | Rome | 156/211 |
| 4,462,854 | 7/1984 | Wenstrom et al. | 156/250 |
| 4,975,011 | 12/1990 | Holmberg | 412/6 |
| 4,986,864 | 1/1991 | Heim et al. | 156/201 |
| 5,221,112 | 6/1993 | Holmberg | 281/21.1 |

*Primary Examiner*—Francis J. Lorin
*Attorney, Agent, or Firm*—Biebel & French

[57] ABSTRACT

A method and apparatus for manufacturing, on an automatic continuous basis, successive album pages, each of which consists of a base sheet having a reinforcing tape bound thereto in overlapping relation with each side edge thereof, is disclosed. The apparatus includes a registration station for guiding and initially folding a pair of tapes in proper laterally spaced relation to receive a base sheet therebetween. A compression station is positioned downstream from the registration station and includes a pair of releasable clamps having engagement surfaces for completing the folding of the pairs of tapes into adhering relation with respective side edges of the base sheet thereby forming a web of album pages interconnected by the pair of tapes. A drive mechanism includes a servo-motor driven linear actuator for pulling at least one of the base sheets and the web of album pages downstream. More particularly, the sheet immediately upstream from the web is pulled into the compression station wherein the folding of the tapes results in the sheet being interconnected with the web of album pages.

17 Claims, 14 Drawing Sheets

PAGE BINDING METHOD AND MACHINE

BACKGROUND OF THE INVENTION

1. Field of the Invention

The present invention relates to an apparatus and method for binding individual pages for subsequent assembly in an album, such as a looseleaf photograph album.

2. Description of the Prior Art

The present invention is particularly concerned with the forming of album pages comprising a sheet of paperboard for retaining photographs or cards. The album page may include a plurality of pockets formed by sheets of clear plastic secured along their sides and bottom edges to the surface of the base sheet. An example of such an album page is shown in U.S. Pat. No. 3,735,516 to Winstrom, which is assigned to the assignee of the present invention. This patent also shows such an album page having the reinforcing tapes overlapping and bonded to the side edges of the sheet, with one of the reinforcing tapes also serving as a mounting for a plurality of U-shaped staples that form hinges by which multiple sheets are bound in an album.

The economical production of multiple pages of this type has proven to be a difficult task. An example of a machine for the production of multiple album pages is disclosed in U.S. Pat. No. 3,620,882 to Chou et al., which is assigned to the assignee of the present invention. In the Chou et al. machine, staples are supplied to a reinforcing tape for one side edge of successive album pages, adhesive on one surface of the tape is activated, individual sheets are manually fed into assembled relation with the tape, the assembled sheet and tape are pressed together, and successive assembled sheets and tape are advanced to a cut off station where the tape is severed. In order to apply reinforcing tape to the other side edge of the resulting page, it must be passed through the machine a second time for assembly with tape to which no staples have been applied.

Machines constructed in accordance with the Chou et al. patent have been used to produce satisfactory products, but such machines are relatively slow in operation, which correspondingly reduces the rate in which they produce album pages. They are also highly labor-intensive in that they require constant activity by operators to carry out the manual operations of individually loading, unloading and reloading each successive sheet.

In response to the problems of the prior art machines, attempts have been made to improve the efficiency in producing quality album pages. An example of such a machine is disclosed in U.S. Pat. No. 4,986,864 to Heim et al., which is assigned to the assignee of the present invention and incorporated herein by reference. In the Heim et al. machine, a pair of tapes are folded and pressed into overlapping adhered relation with the side edges of a base sheet to form a web consisting of a series of pages held together by intermediate pieces of the pair of tapes. The tapes, successive sheets and resulting web are drawn through the machine by a reciprocating carriage. During forward feeding movement of the carriage, the web is clamped to the carriage thereby conveying successive pages downstream through a page assembly station. The pair of tapes are clamped to a cut off station downstream from the page assembling station wherein the pieces of tape connecting the leading page to the remainder of the web are cut out to leave the leading page free for further processing.

While the Heim et al. machine has dramatically improved the speed at which album pages are produced, the drive system of this machine comprises a complicated arrangement of rods connected to a rocker arm for converting oscillating movement of the rocker arm into linear reciprocating movement of a carriage. While this mechanism is a dramatic improvement over the earlier page binding machines, its complicated arrangement limits its operating speed and requires substantial routine maintenance. Additionally, this prior art drive system often causes successive sheets to be out of register, i.e. having varying spacing therebetween, due to its complex mechanical arrangement.

Accordingly there is a need for an improvement to the prior art page binding method and machine for efficiently producing album pages of consistent high quality. Furthermore there is a need for such a machine having a simplified design thereby resulting in reduced construction costs and routine maintenance expenses.

SUMMARY OF THE INVENTION

The present invention provides a method and apparatus for manufacturing consistently high quality album pages on an automatic continuous basis at high production speeds.

The apparatus of the present invention is adapted for manufacturing successive album pages of predetermined length and width, each of which comprises a base sheet having reinforcing tapes bound thereto in overlapping relation with opposing side edges thereof. The apparatus comprises a registration station for guiding a pair of tapes in proper laterally spaced relation to receive a sheet therebetween. The registration station includes folding means for folding the pair of tapes into overlapping adhered relation with respective side edges of the sheet. Additionally, the registration station comprises securing means for preventing undesirable movement of the sheet when positioned in the registration station and thereby facilitating proper alignment of the sheet with the pair of tapes. A movable page stop is provided for registering or locating a following sheet immediately upstream from the sheet positioned within the registration station thereby facilitating a predetermined space between successive sheets in the web.

A compression station is positioned downstream from the registration station and includes a pair of releasable clamps having engagement surfaces aligned above and below the pair of tapes. At least one actuator is operably connected to each of the releasable clamps wherein activation of the actuator forces the engagement surfaces into compressing relationship with the pair of tapes thereby completing the folding of the pair of tapes and adhesion thereof with respective side edges of the sheet. The compression station is movable in the longitudinal or machine direction to accommodate sheets of different lengths.

A drive mechanism is provided for drawing or pulling the sheet and the pair of tapes downstream through the registration and compression stations and thereby drawing additional lengths of the pair of tapes toward the registration station. The drive mechanism includes a rail member, a carriage supported upon the rail member, and a servo motor operably connected to the carriage. A controller selectively activates and deactivates the servo motor for linear reciprocating movement of the carriage between an upstream and downstream position to form a web comprising a plurality of successive sheets connected with each other by the pair of tapes. Releasable clamping means are supported on the carriage for clamping the web to the carriage during movement of the carriage towards the downstream position and releasing the web prior to movement of the carriage towards the upstream position.

The drive mechanism further comprises a sensor supported upstream from the page stop and the registration station for detecting a following sheet upstream from the web and producing a signal indicative thereof The controller selectively activates the releasable clamping means and servo motor of the drive mechanism in response to the signal produced by the sensor. The controller is programmable to adjust the length of movement of the carriage to correspond to sheets of different lengths.

The method of the present invention comprises the steps of advancing a following sheet downstream towards the web, generating a signal indicative of the position of the following sheet, and providing a carriage, releasable clamping means supported on the carriage, and a servo motor operably connected to the carriage. The releasable clamping means is activated for clamping the web to the carriage in response to the signal. Likewise, the servo motor is activated for driving the carriage in linear movement to a downstream position in response to the signal, thereby conveying the following sheet and web downstream. The controller deactivates the servo motor, thereby stopping the carriage, when the carriage reaches a predetermined downstream position. The releasable clamping means is thereafter deactivated for releasing the web from the carriage and the servo motor is activated for driving the carriage in linear movement to an upstream position while the web remains stationary.

Therefore, it is an object of the present invention to provide a method and apparatus for manufacturing album pages on an automatic continuous basis with minimal human intervention.

It is another object of the present invention to provide such a method and apparatus for manufacturing album pages at high production speeds.

It is a further object of the present invention to provide such a method and apparatus for manufacturing album pages of consistent high quality.

It is still another object of the invention to provide an apparatus of simple design for manufacturing album pages resulting in reduced initial start up and maintenance costs.

Other objects and advantages of the invention will be apparent from the following description, the accompanying drawings and the appended claims.

DETAILED DESCRIPTION OF THE PREFERRED EMBODIMENT

Figure 1:
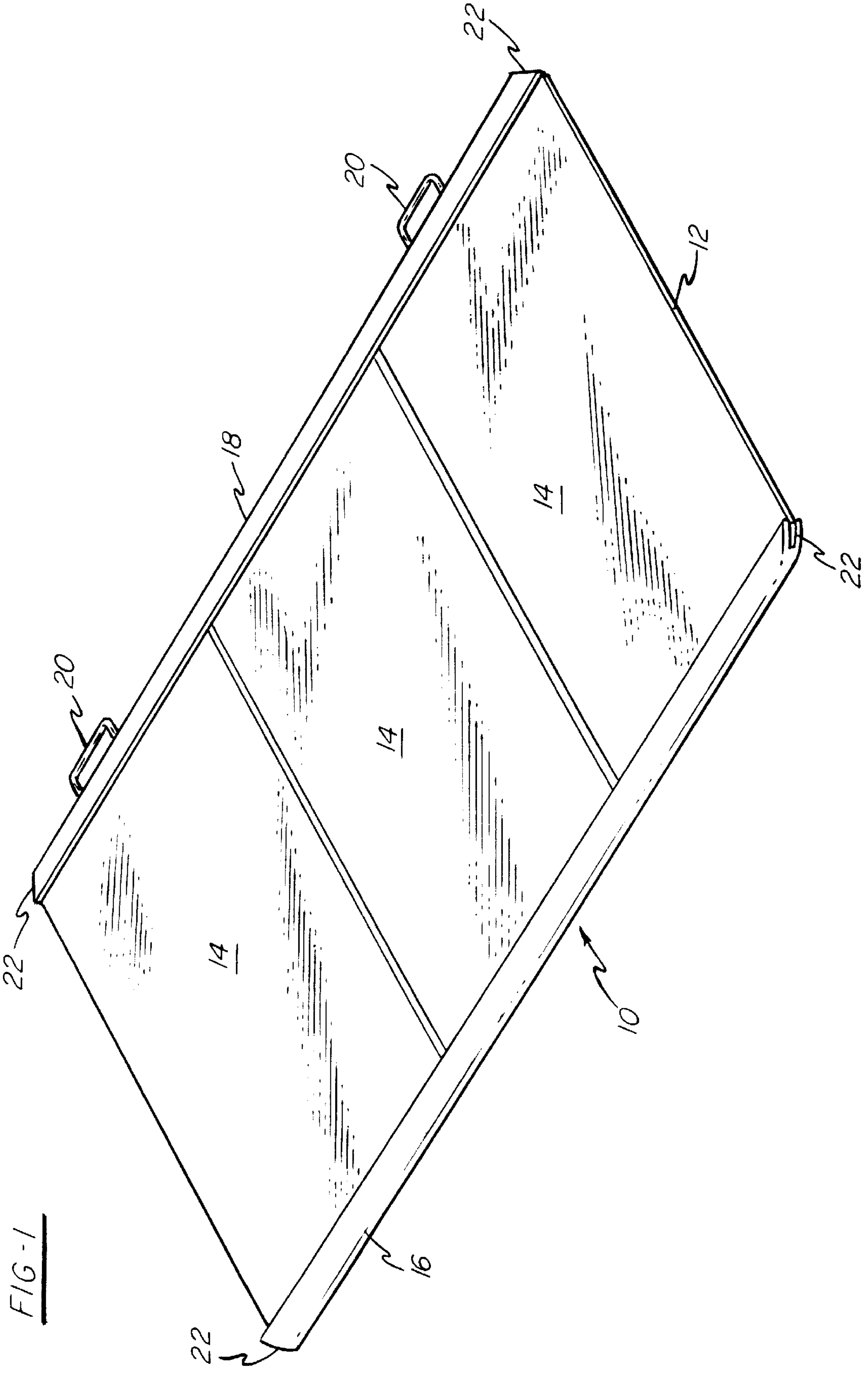
FIG. 1 is a perspective view showing a completed album page produced by the apparatus of the present invention.

The method and apparatus of the present invention is for use in the manufacture of individual pages for an album such as the page 10 shown in FIG. 1, which comprises a base sheet 12 of paperboard or plastic having a plurality of pockets on one or both surfaces thereof. Each pocket is formed by a sheet 14 of clear plastic adhered or otherwise secured along its side and bottom edges to the surface of the sheet 12. While pockets are illustrated in FIG. 1, it should be emphasized that the method and apparatus of the present invention may be used to produce a wide variety of album pages with or without pockets formed by plastic sheets 14. Reinforcing tapes 16 and 18 are adhered in overlapping relation with the inner and outer side edges of the sheet 12, and the inner edge tape 18 also carries a pair of wire staples 20, each of which includes a bite portion projecting therefrom for use in binding a plurality of pages 10 in an album. As shown in FIG. 1 at reference numeral 22, the corners of the page 10 are rounded.

The method and apparatus of the present invention has the primary purpose of attaching the tapes 16 and 18 to each of a series of successive base sheets 12 in a continuous process wherein successive base sheets 12 are joined with a pair of continuous tapes 16 and 18 to form a web comprising completed pages 10 interconnected by the tapes 16 and 18. Successive pages 10 are thereafter separated from the leading end of the web.

Figure 2:
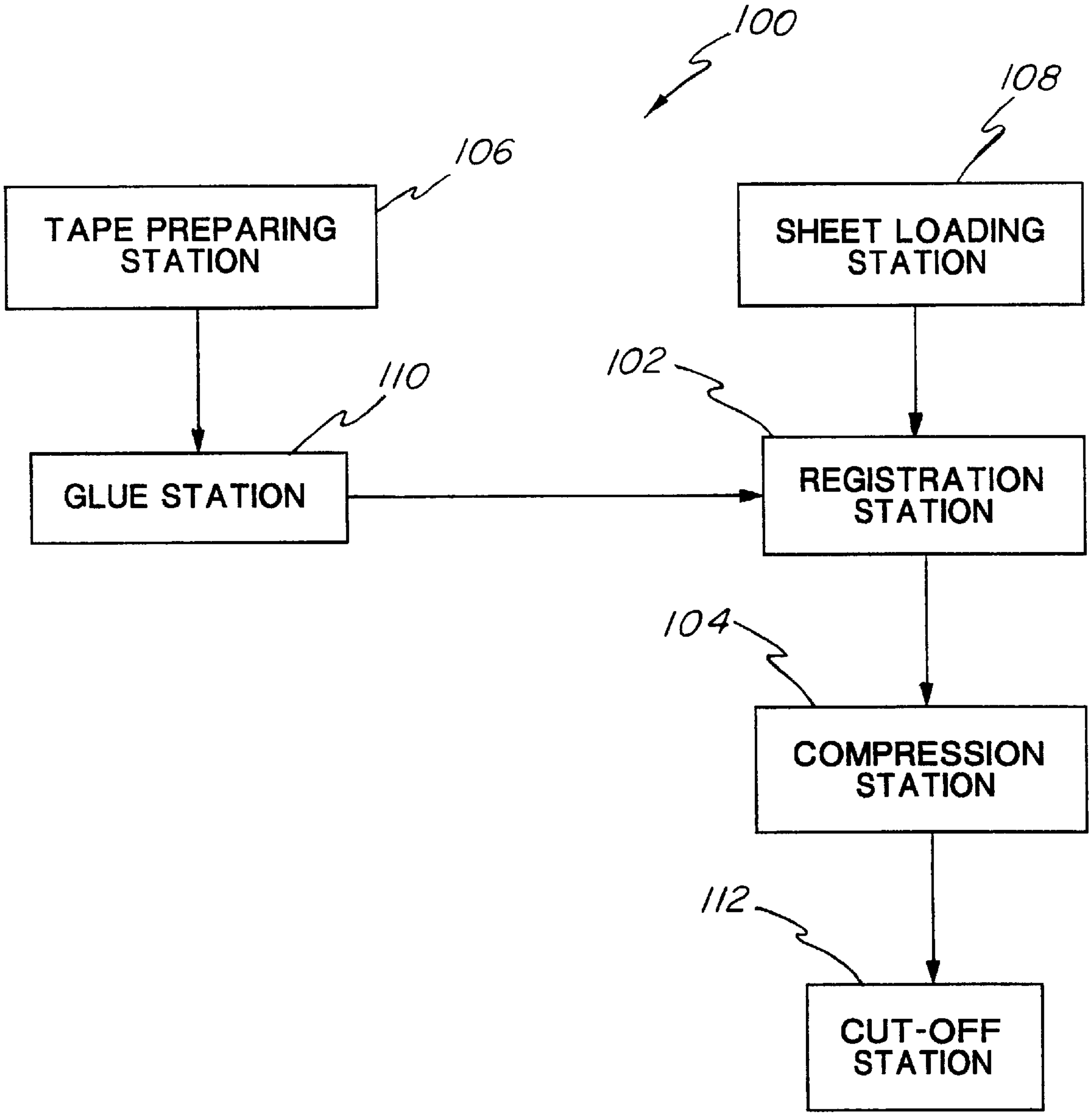
FIG. 2 is a block diagram of the apparatus of the invention by which the method of the invention is performed.

FIG. 2 is a block diagram of the page binding machine 100 of the present invention, illustrating six primary stations for producing an album page 10. The present invention relates to the registration and compression stations 102 and 104 as illustrated in FIGS. 3–6. The tape preparing station 106, the sheet loading station 108, the glue station 110 and the cut-off station 112, may all be of type described in detail in U.S. Pat. No. 4,986,864 to Heim et al., which has been incorporated herein by reference. More particularly, the two continuous strips of tape 16 and 18 are creased, and staples 20 are applied to one of the tapes 16 and 18 in the tape preparing station 106. The sheet loading station 108 feeds successive base sheets 12 to the registration station 102, while the glue station 110 applies glue to both of the creased tapes 16 and 18. The tapes 16 and 18 connecting the leading page 10 to the remainder of the web of pages 10 are severed in the cut-off station 112.

After the tapes 16 and 18 leave the glue station 110, each is passed through the registration station 102 wherein the tapes 16 and 18 are initially brought into contact with a base sheet 12 advanced from the sheet loading station 108. Each tape 16 and 18 is progressively folded along its crease line so that its sides form approximately a 70° right angle when the tapes are first brought into engagement with each successive base sheet 12. With further reference to FIGS. 5 and 7–9, each tape 16 and 18 is guided into contact with a tape bend bar 114 of rectangular cross section wherein each tape bend bar 114 is mounted on a base plate 116 forming part of the compression station 104. The tape bend bars 114 are in spaced relation with each other in the cross machine direction on opposite sides of a page path P defined by the longitudinal movement of successive sheets 12 through the machine 100.

Figure 8:
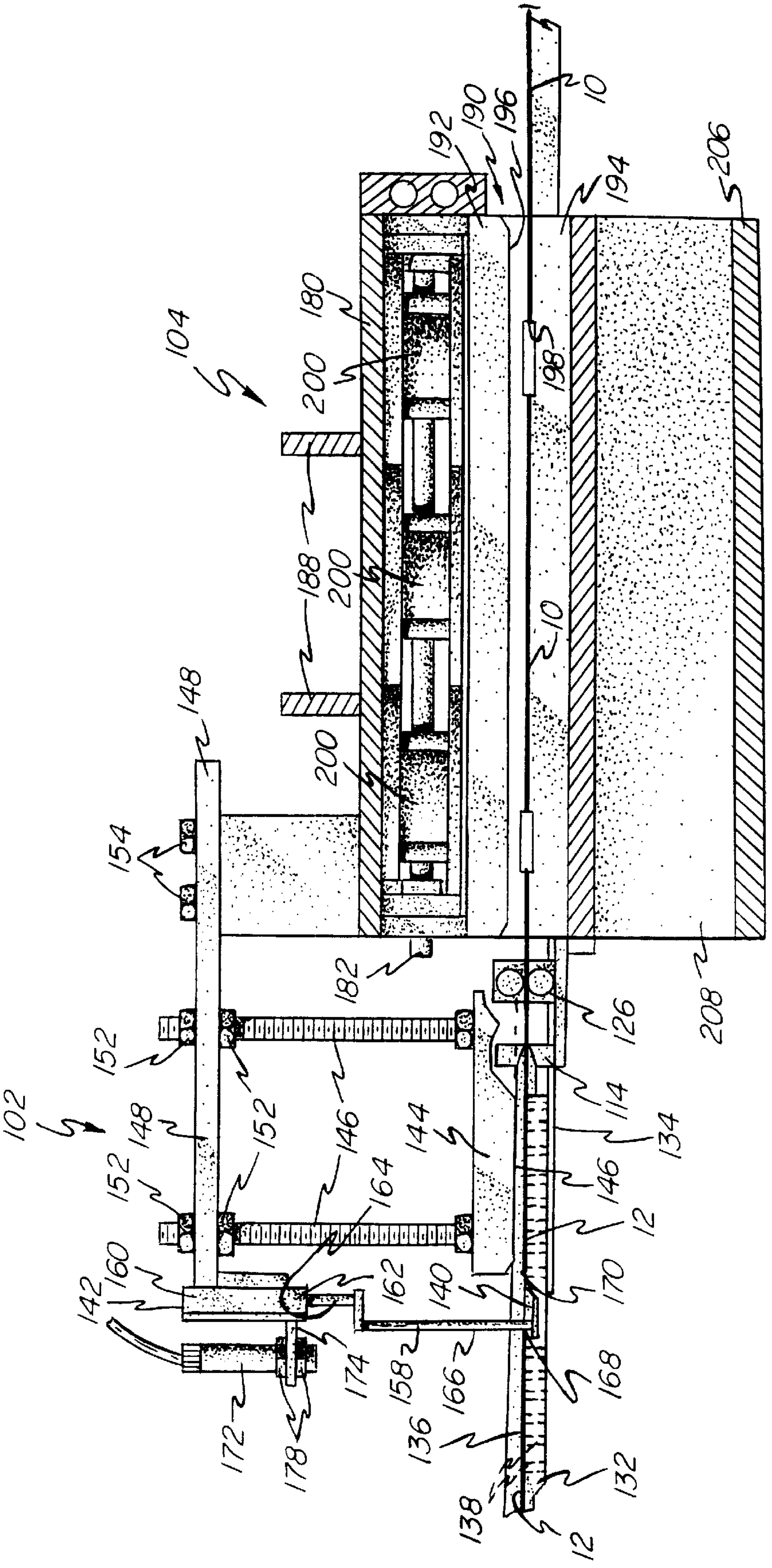
FIG. 8 is a cross-sectional view taken along lines 8—8 of FIG. 7.
Figure 9:
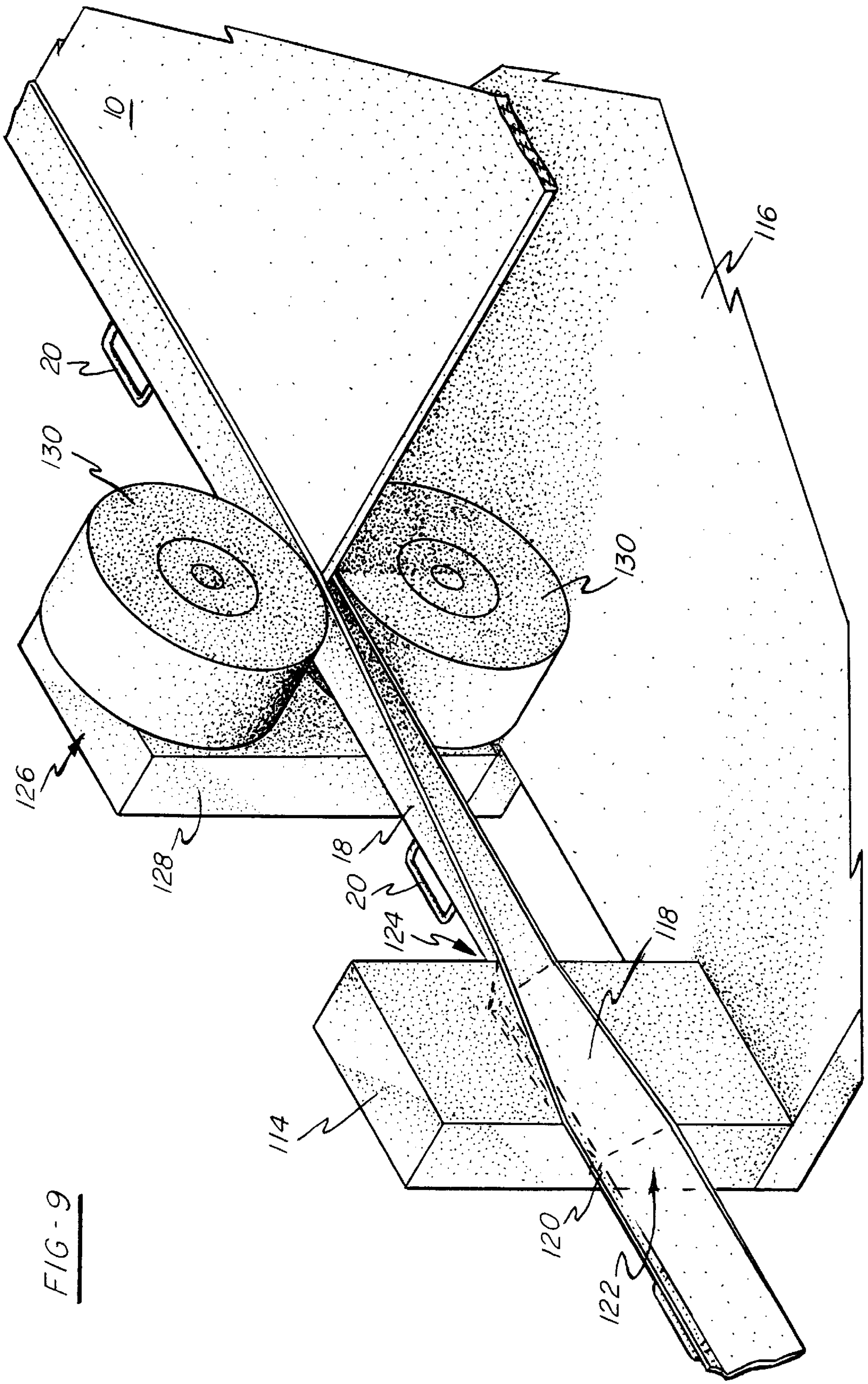
FIG. 9 is a fragmentary perspective view showing the tape bend bar and pre-compression device of the present invention

As shown in FIG. 8 and 9, the inner edge of each tape bend bar 114 is provided with a v-shaped notch 118 having a slot 120 at its apex. The notch 118 may be provided with an upstream end 122 defining an angle of approximately 120° tapering to a downstream end 124 defining an angle of approximately 70°.

As may be readily appreciated, the notches 118 progressively fold each tape 16 and 18 to approximately a 70° relation to its two halves, while the staples 20 carried by the tape 18 pass through the slot 120. In operation, the opposed notches 118 in the tape bend bars 114 establish the width of each successive page 10 and maintain that width constant even if the individual base sheets 12 vary from a pre-established value.

After the tapes 16 and 18 leave their respective tape bend bar 114, each is conveyed to a pre-compression device 126 for bringing each half of the tapes 16 and 18 into initial engagement with a base sheet 12. The pre-compression devices 126 are in spaced relation to each other in the cross machine direction on opposite side edges of the page path P wherein brackets 128 are mounted on the base plate 116 of the compression station 104. Each pre-compression device 126 comprises a pair of cooperating rollers 130 rotatably supported on one of the brackets 128 wherein the rollers 130 are spaced apart at a predetermined distance for initially folding each tape 16 and 18 into engagement with a respective base sheet 12.

Figure 7:
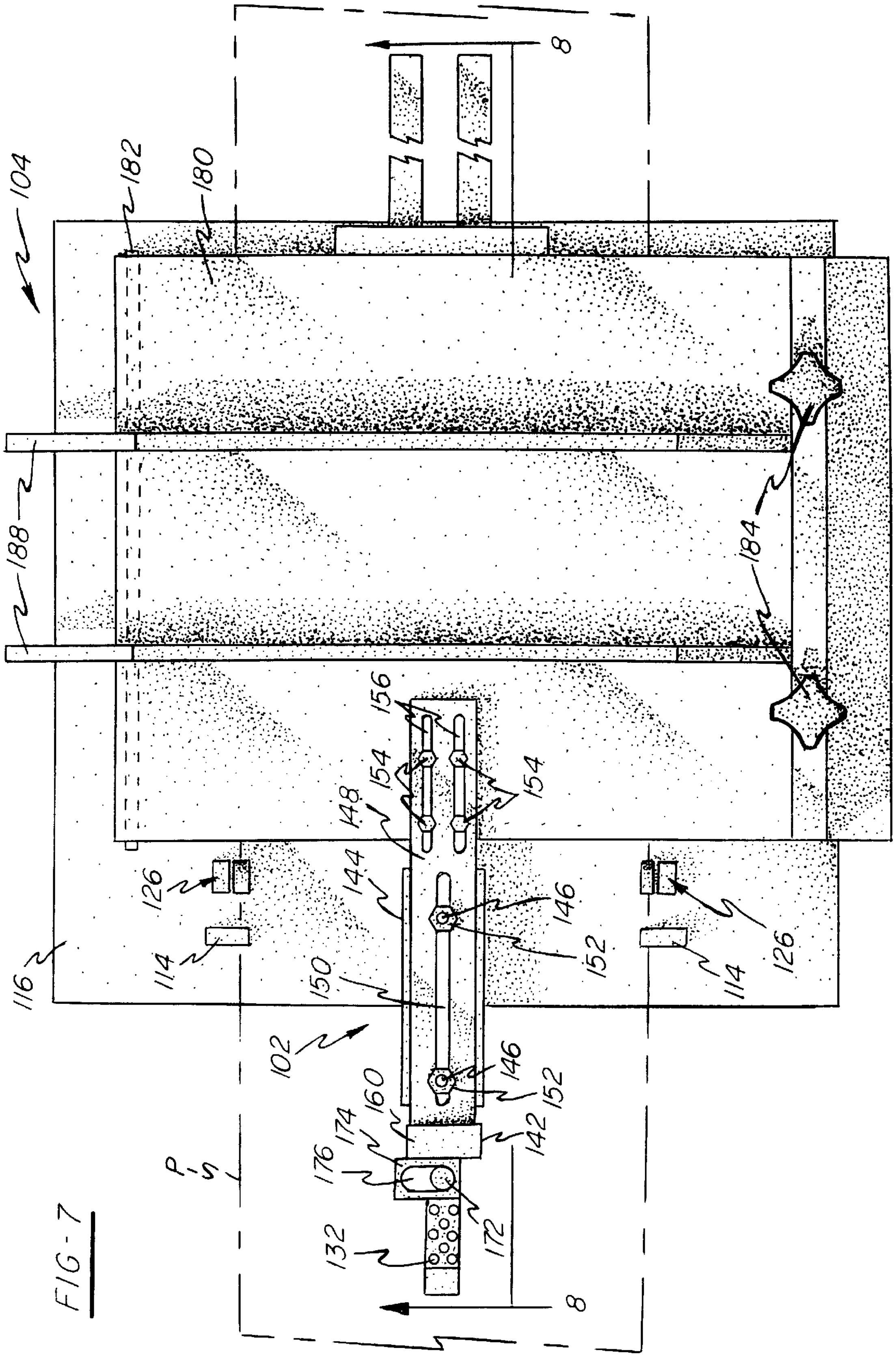
FIG. 7 is a top plan view of the compression station of the present invention.

With further reference to FIGS. 7 and 8, the registration station 102 further comprises securing means for preventing undesirable movement of each successive base sheet 12 before it enters the compression station 104. More particularly, the securing means comprises a vacuum bar 132 supported by a bracket 134 fixed to the compression station 104 wherein the vacuum bar 132 is centrally positioned laterally within the page path P. The vacuum bar 132 is vertically positioned immediately below the page path P such that successive base sheets 12 are supported on a substantially planar upper surface 136 of the bar 132. The substantially planar upper surface 136 is formed with a plurality of apertures 138 in fluid communication with a vacuum source (not shown). The upper surface 136 of the vacuum bar 132 further comprises a recessed portion 140 for receiving a portion of a page stop 142 as will be described in greater detail below.

A holddown shoe 144 having a substantially planar lower surface 146 faces a portion of the upper surface 136 of the vacuum bar 132. As clearly illustrated in FIG. 8, successive base sheets 12 are received between the vacuum bar 132 and holddown shoe 144 wherein the vacuum bar 132 and holddown shoe 144 cooperate to prevent undesirable shifting or upward movement of the sheets 12. The vacuum bar 132 additionally prevents undesirable rotation or skewing of the sheet 12 within the registration station 102.

The holddown shoe 144 is supported by a pair of threaded rods 146 secured to a support arm 148. The hold down shoe 144 is adjustable in the longitudinal or machine direction along a slot 150 formed within the support arm 148 (FIG. 7). Similarly, the shoe 144 is adjustable in a vertical direction by the rotation of nuts 152 threadably engaging the threaded rods 146. The support arm 148 is secured to the compression station 104 through a plurality of bolts 154 passing through slots 156 formed within the support arm 148. As may be readily appreciated, the slots 156 provide for adjustment of the support arm in the longitudinal or machine direction.

The page stop 142 is supported upstream from the registration station 102 and above the vacuum bar 132. The page stop 142 includes a stop arm 158 supported for linear vertical movement by a pneumatic cylinder 160 including a body portion 162 and a movable rod 164. While the pneumatic cylinder 160 preferably comprises, Model No. CXSM-15-20 available from SMC Pneumatics, Inc. of Indianapolis, Ind., any similar device may be substituted therefore.

As seen in FIG. 8, when the pneumatic cylinder 160 is actuated and the rod 164 extended, the stop arm 158 is received within the recessed portion 140 of the vacuum bar 132 thereby intersecting the page path P. In other words, an upstream surface 166 of the stop arm 158 is engagable with a leading edge 168 of a following sheet 12 advancing towards the web of pages 10. It may be appreciated that the page stop 142 registers the leading edge 168 of each successive following sheet 12 relative to the trailing edge 170 of the preceding sheet 12. The page stop 142 thereby ensures proper spacing between each successive page 10 for accurate cutting of the tape 16 and 18 occupying the gaps between adjacent pages 10 by the cut-off station 112.

A sensor 172 is supported upstream from the page stop 142 and above vacuum bar 132 and the page path P for sensing the following base sheet 12 as it approaches the stop arm 158, as will be described in greater detail below. The sensor 172 preferably comprises a photosensitive cell, of the type well known in the art, for sensing light levels associated with the location of the following base sheet 12. The sensor 172 is supported by a bracket 174 including a slot 176 through which a portion of the sensor 172 passes (FIG. 7). The sensor 172 may be adjusted in the lateral or cross machine direction along the length of the slot 176 by way of a pair of nuts 178 adapted to engage the portion of the bracket 174 surrounding the slot 176.

Figure 10:
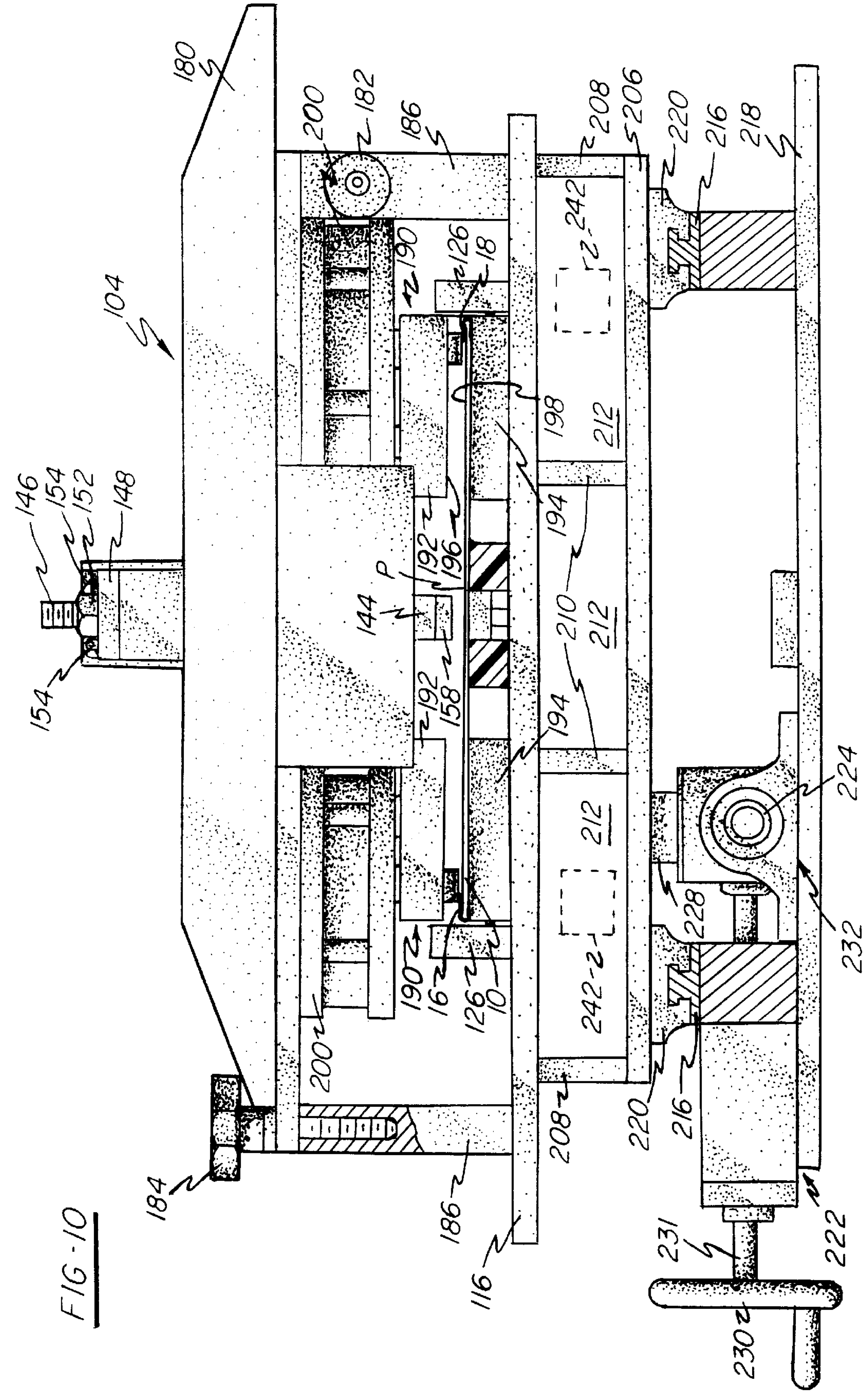
FIG. 10 is a downstream end view of the compression station of FIG. 7.

As described above, the compression station 104 includes the base plate 116 supporting the tape bend bars 114 and precompression devices 126. A top plate 180 is hinged about a pin 182 such that an operator may raise the top plate 180 to gain access to the interior of the compression station 104 for routine maintenance and for clearing page blockages. A pair of threaded knobs 184 engage threaded apertures (not shown) in a side wall 186 of the compression station 104 to thereby secure top plate 180 in a substantially horizontal position during operation of the compression station 104 (FIG. 10). A pair of gussets 188 extend in the lateral or cross machine direction for adding structural strength to the top plate 180.

Turning now to FIGS. 8 and 10, a pair of releasable clamps 190 extend longitudinally in the machine direction and in spaced relation with each other in the cross machine direction along opposite side edges of the page path P. More particularly, the releasable clamps 190 are aligned to compress the newly applied tapes 16 and 18 thereby completing the folding and adhering of the tape 16 and 18 to the base sheets 12, and forming a web of album pages 10 interconnected by the tapes 16 and 18.

Each releasable clamp includes upper and lower shoes 192 and 194 having engagement surfaces 196 and 198 facing opposite sides of the paperboard path P and thereby defining a passageway through which opposite side edges of the sheets 12 and the corresponding pairs of tapes 16 and 18 are received. Three pneumatic cylinders 200 are operably connected to the upper shoes 192 of each releasable clamp 190 for linearly moving the upper shoes 192 in a vertical direction relative to the lower shoes 194. The pneumatic cylinders 200 preferably comprise 3 inch bore pancake cylinders, Model No. FOD-700.75-V, available from Bimba Manufacturing Company, Monee, Ill. However, any similar linear actuator may be substituted therefore.

The pneumatic cylinders 200 connect the upper shoes 192 to the top plate 180 for relative movement therebetween. The lower shoes 194 are rigidly fixed to the base plate 116 and remain vertically stationary. When the pneumatic cylinders 200 are activated, they move the upper shoes 192 linearly downwardly towards the lower shoes 194 until the tapes 16 and 18 are compressed with the base sheet 12 hereby folding the tape 16 and 18 into adhered to relation with the base sheet 12 to form the web of album pages 10.

As may best be seen in FIG. 10, the base plate 116 is fixed to a transfer late 206 by a pair of sidewalls 208 and intermediate support walls 210 thereby forming apluralíty of clearance channels 212. As will be described in greater detail below, the channels 212 are provided to receive a portion of a drive mechanism 214.

The transfer plate 206, and in turn compression station 104, are supported on a pair of guide rails 216 supported on a machine frame 218. A pair of linear bearing blocks 220 engage each guide rail 216 and are fixed to the transfer plate 206 wherein the compression station 104 may be moved in the longitudinal or machine direction along the guide rails 216 to accommodate sheets 12 of various lengths. For example, sheet lengths often vary from approximately 5 inches to 12 inches thereby requiring longitudinal movement of the compression station 104 to facilitate adequate folding of the tapes 16 and 18 into adhering relation with the successive base sheets 12.

Figure 3:
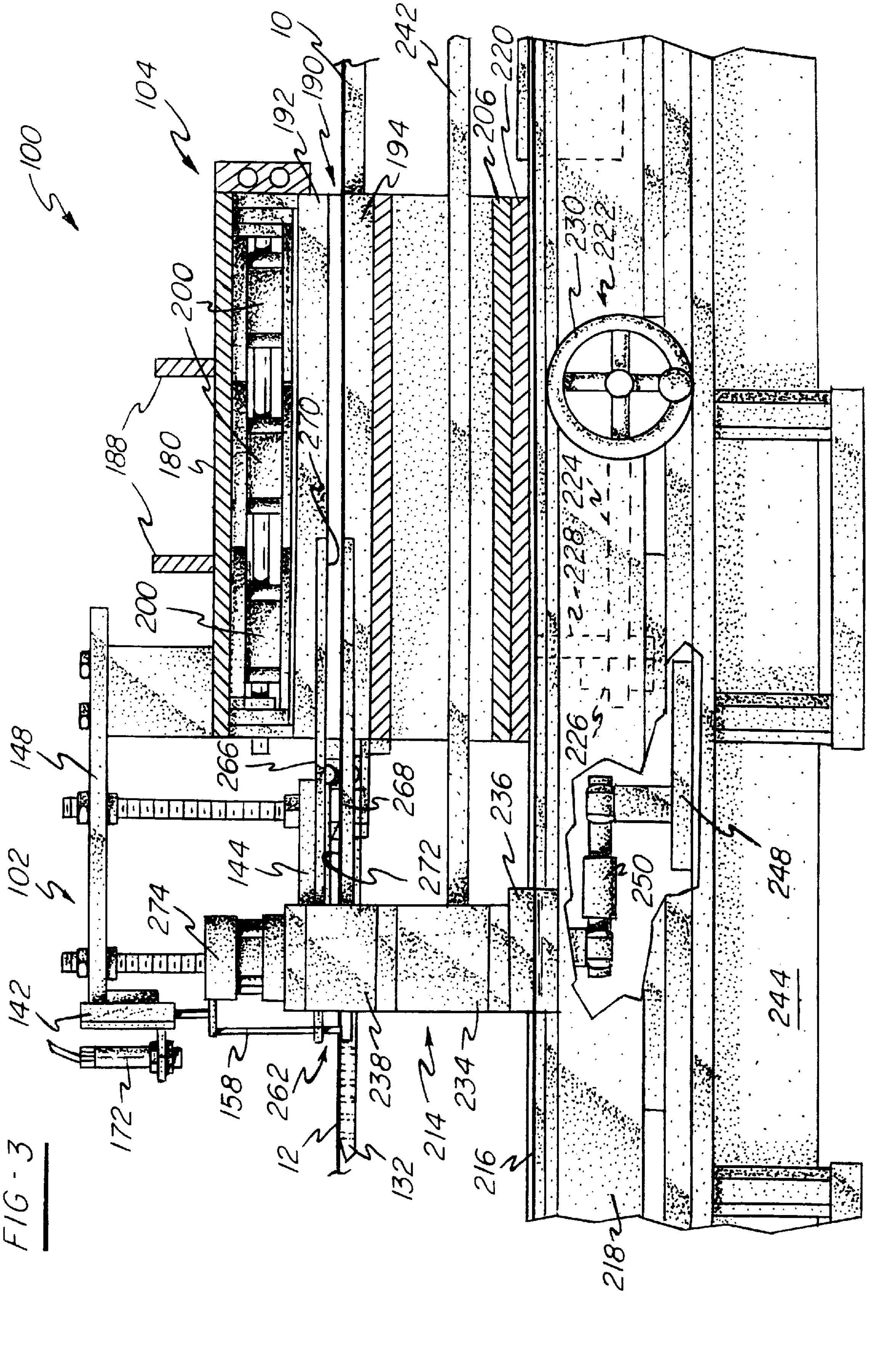
FIG. 3 is a side elevational view of approximately the first one-half of the apparatus of the invention with the compression station shown in cross-section.
Figure 4:
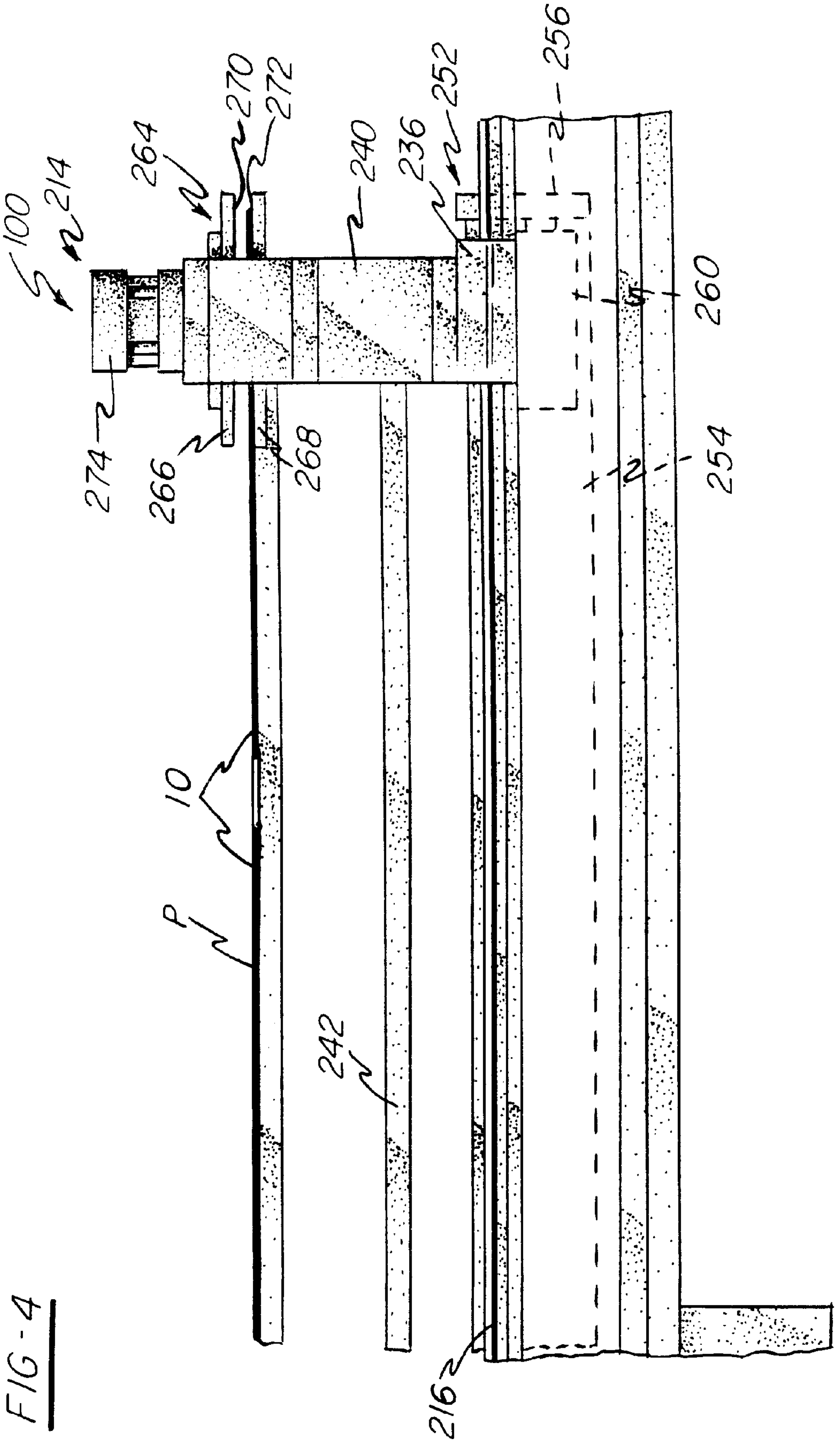
FIG. 4 is a side elevational view similar to FIG. 3 of the second one-half of the apparatus of the invention.
Figure 5:
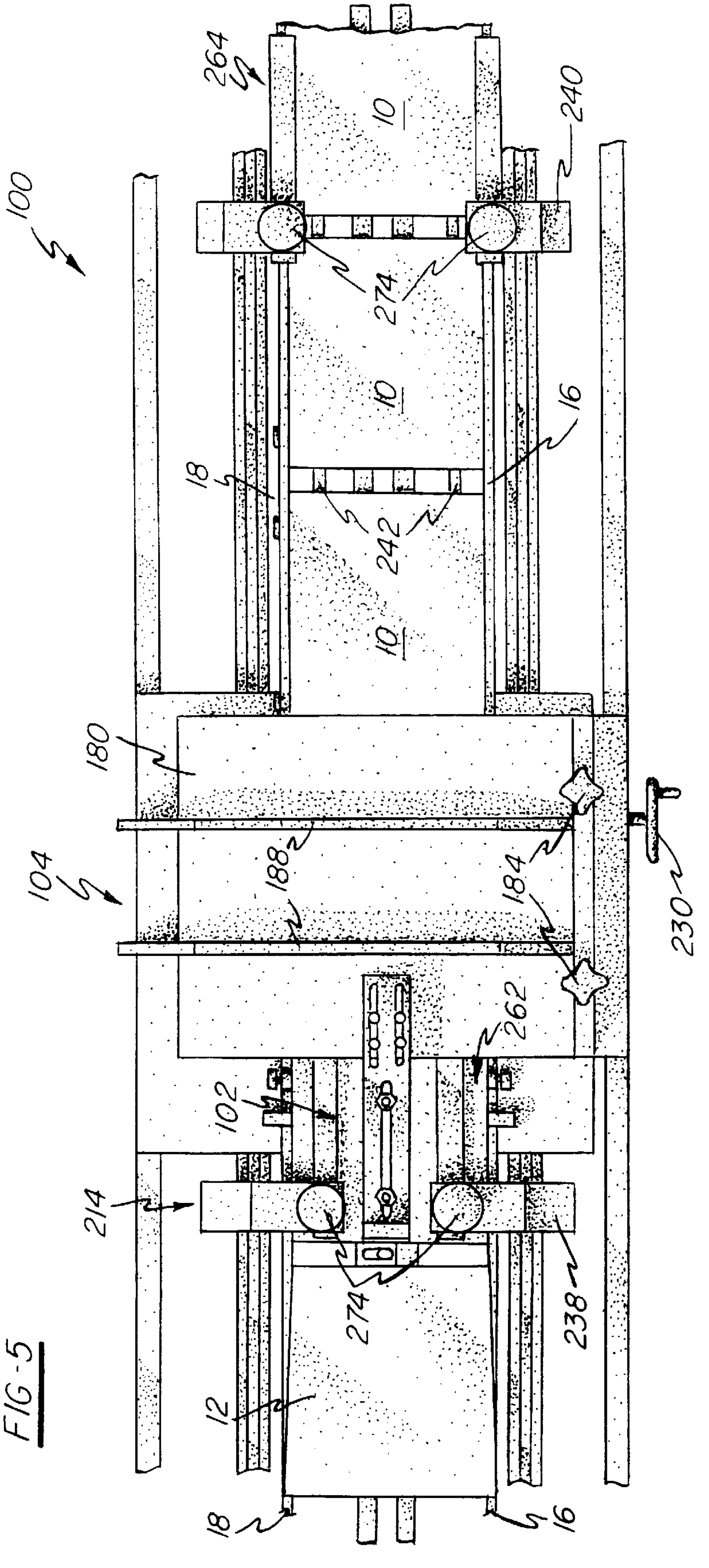
FIG. 5 is a top plan view of the apparatus of FIGS. 3 and 4.
Figure 6:
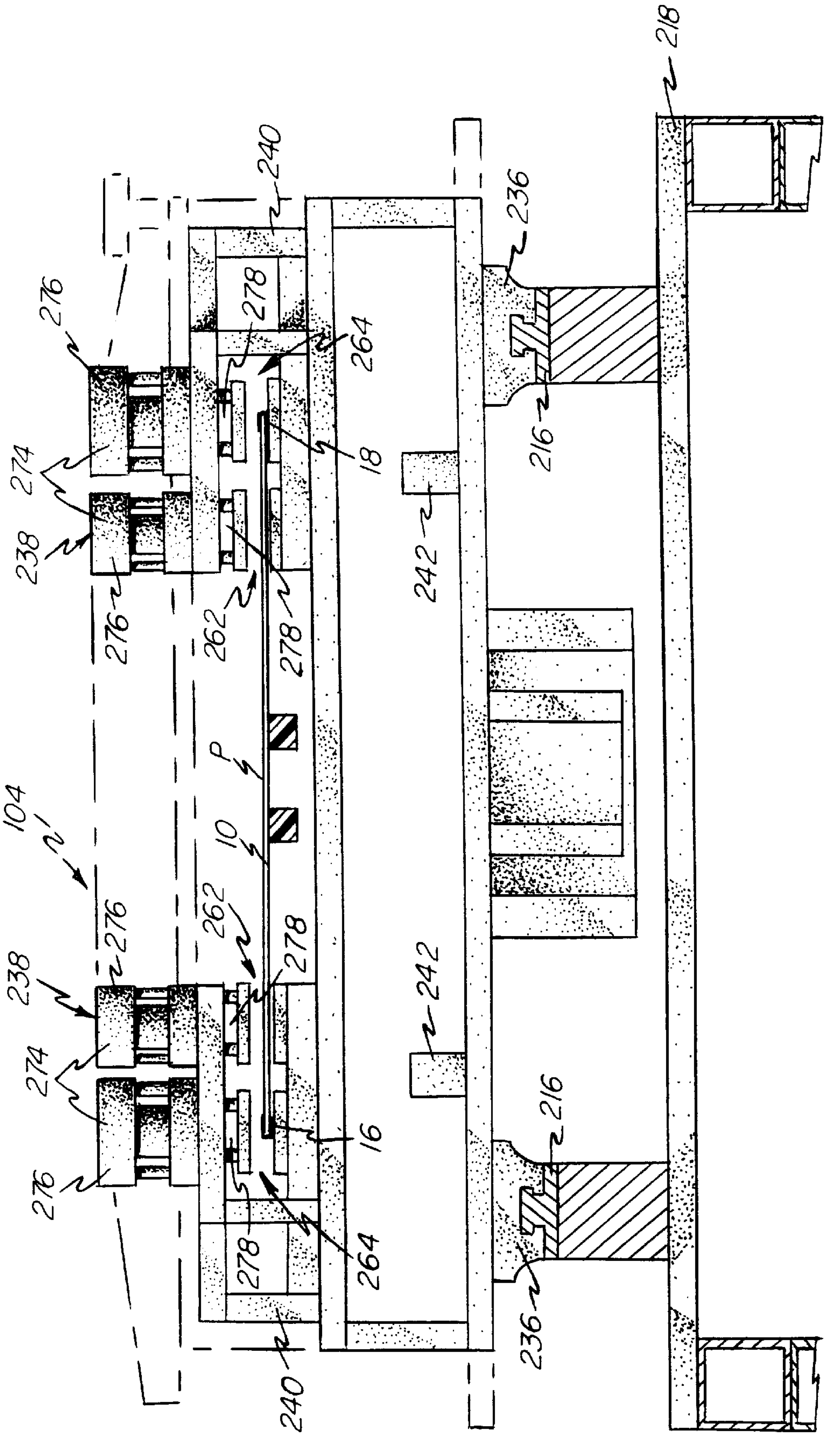
FIG. 6 is an upstream end view of the apparatus of FIGS. 3 and 4.

In order to facilitate movement of the compression station 104, an adjustment mechanism 222 is provided. Turning now to FIGS. 3 and 10, the adjustment mechanism 222 includes a screw jack 224 for threadably engaging a nut 226. The nut 226 is secured to a coupling element 228 fixed to the transfer plate 206. The screw jack 224 is driven in rotation by a hand crank 230 having a shaft 231 operably connected to the screwjack 224 through a gear assembly 232 which preferably comprises a pair of bevel gears (not shown) disposed at a 90° angle to each other in a manner as is well known in the art. As may be readily appreciated, rotation of the hand crank 230 in a first direction causes corresponding rotation of the screw jack 224 for movement of the compression station 104 along the guide rails 216 in a first longitudinal direction through the machine. Likewise, rotation of the hand crank 230 in a second direction causes corresponding rotation of the screw jack 224 and movement of the compression assembly 104 along the guide rails 216 in a second longitudinal direction through the machine.

Referring further to FIGS. 3–6, the apparatus of the present invention further comprises drive mechanism 214 for cooperating with the compression station 104 to form the web of pages 10. More particularly, the drive mechanism 214 straddles the compression station 104 for reciprocating movement between upstream and downstream positions wherein successive sheets 12 and the pair of tapes 16 and 18 are drawn downstream through the registration and compression stations 102 and 104. The drive mechanism 214 includes a transfer carriage 234 which is caused to reciprocate relative to the registration and compression stations 102 and 104 in timed relation with other parts of the machine 100. During each forward stroke of the transfer carriage 234, it carries with it the web of sheets 10 and tapes 16 and 18 until the trailing edge of the leading assembled page 10 is properly positioned within the cut off station 112 (FIG. 2) such that the pieces of tape 16 and 18 which connect the leading pair of assembled pages 10 are aligned with cutting punches (not shown). At the same time, the carriage 234 causes one of the base sheets 12 to be brought into initial engagement with the tapes 16 and 18 at the trailing end of the web in the registration station 102.

The carriage 234 is supported on two pairs of linear bearing blocks 236 engaging the pair of guide rails 216 thereby facilitating longitudinal movement of the carriage 234 in the machine direction. The bearing blocks 220 and 236 and guide rails 216 preferably comprise Linear Motion Guide, Model No. HSR-20CASS available from TEK America of Schaumburg, Ill.

The transfer carriage 234 includes upstream and downstream support structures 238 and 240 rigidly connected by a pair of connecting bars 242 such that movement of the upstream support structure 238 results in corresponding movement of the downstream support structure 240. The connecting bars 242 pass through the outside channels 212 of the compression station 104 such that the compression station 104 does not interfere with the reciprocating movement of the carriage 234.

Reciprocating movement of the transfer carriage 234 is provided by a servo motor driven linear actuator 244. The linear actuator 244 preferably comprises model number XY-HRS 1045-M201AD available from Adept Technology, Inc., San Jose, Calif., although any similar servo motor driven linear actuator may be substituted therefore. The operation of the linear actuator 244 may be controlled by a controller 246 whereby the speed and travel distance of the transfer carriage 234 may be readily adjusted. The linear actuator 244 conveys a driving block 248 which is operably connected to the upstream support structure 238 through a linkage 252. Movement of the driving block 248 by the linear actuator 244 is therefore transferred to the upstream and downstream support structures 238 and 240 through the connecting bars 242 which pass through channels 212 within the compression station 104.

Figure 11:
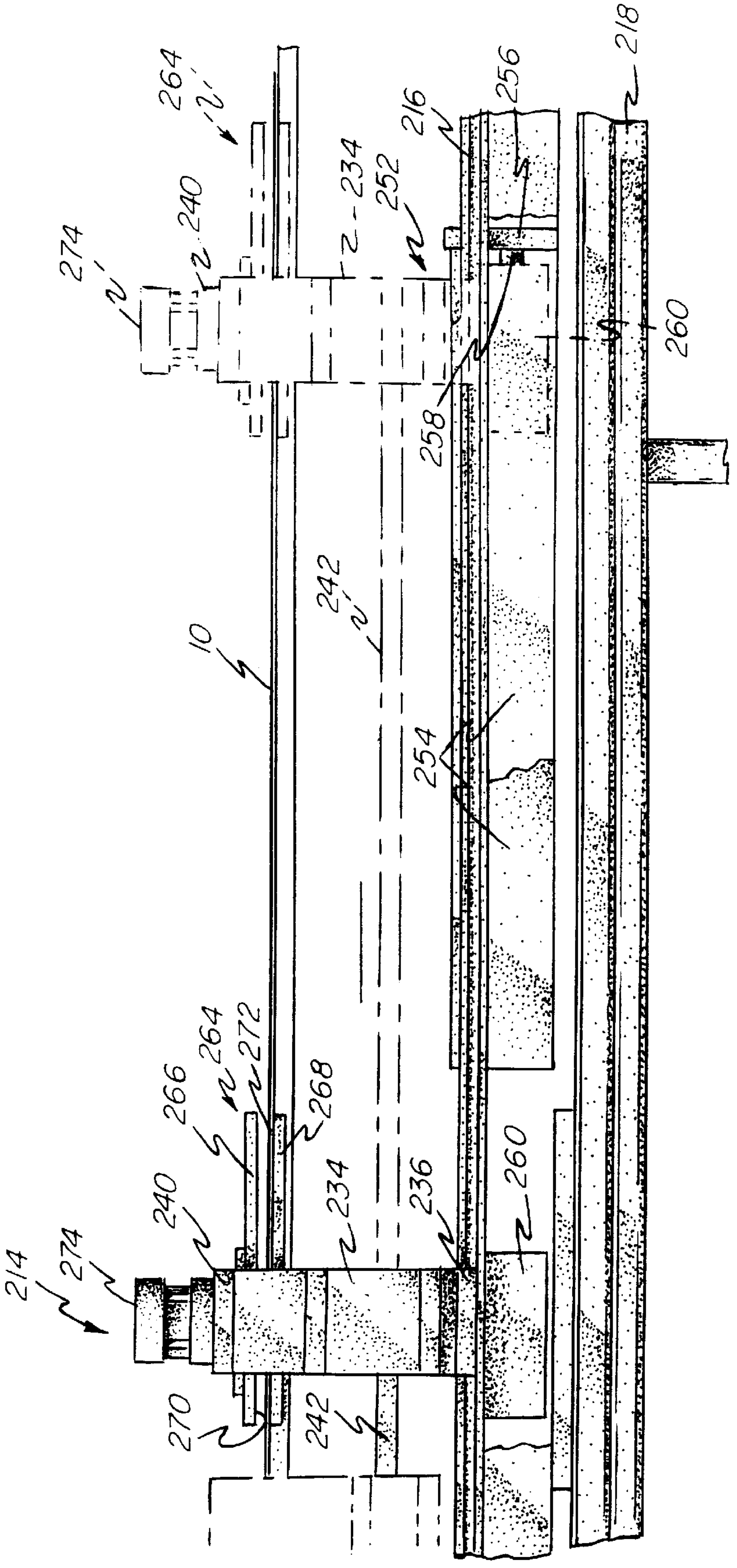
FIG. 11 is a partial side elevational view of the apparatus of the present invention with a partial cut-away illustrating the shock absorbing mechanism of the present invention.

Referring now to FIG. 11, a shock absorbing assembly 252 is provided to prevent damaging over travel of the transfer carriage 234. The shock absorbing assembly 252 includes a pair of longitudinal extending shock bars 254 supported on the machine frame 218. An end plate 256 extends in the cross machine direction and is rigidly fixed to the downstream ends of the shock bars 254. The end plate 256 supports a rubber bumper 258 for engaging an over travel plate 260 fixed to and extending downwardly from the downstream support structure 240. Should the servo-motor driven linear actuator 244 erroneously cause the transfer carriage 234 to travel beyond its predetermined downstream position, as illustrated in phantom in FIG. 11, the over travel plate 260 will engage the rubber bumper 258 thereby preventing continued travel of the transfer carriage 702 and resulting damage thereto.

Both the upstream and downstream support structure 238 and 240 support a pair of releasable clamps 262 and 264, respectively. The upstream clamps 262 are adapted to selectively engage and clamp at least one of the sheets 12 between the tapes 16 and 18 within the registration station 102. The downstream clamps 264 are adapted to selectively engage and clamp the tapes 16 and 18 which are adhered to the outside edges of the web of assembled pages 10. Each releasable clamp 262 and 264 includes upper and lower shoes 266 and 268 having engagement surfaces 270 and 272, respectively, facing opposite sides of the paperboard path P, thereby defining a passageway through which the sheets 12 are received.

The upstream and downstream support structures 238 and 240 each have mounted thereon a pair of pneumatic cylinders 274 for moving the upper shoe 266 into clamping engagement with the lower shoe 268 for securing a sheet 12 or web of assembled pages 10 therebetween. More particularly, each pneumatic cylinder 274 includes a body portion 276 and movable rods 278 for connecting one of the upper shoes 266 to a respective support structure 238 and 240 for relative movement therebetween. The lower shoes 268 are rigidly fixed to a respective support structure 238 and 240 and therefore remain vertically stationary. While the pneumatic cylinders 274 preferably comprise 1 1/16 inch bore pancake cylinders, Model No. FT-090.5-DE available from Bimba Manufacturing Company of Monee, Ill., any similar linear actuator may be substituted therefore.

When the cylinders 274 of the upstream support structure 238 are activated, the upper shoes 266 of the upstream clamping means 262 are moved linearly downwardly towards the fixed lower shoe 268 such that the engagement surfaces 270 and 272 of the upper and lower shoes 266 and 268 engage the base sheet 12 within the registration station 102 laterally between the pair of tapes 16 and 18. The base sheet 12 within the registration station 102 is thereby secured between the engagement surfaces 270 and 272 of the upper and lower shoes 266 and 268. When the pneumatic cylinders 274 of the downstream support structure 240 are activated, then the engagement surfaces 270 and 272 of the upper and lower shoes 266 and 268 engage and clamp the pair of tapes 16 and 18 secured to the side edges of the base sheet 12 which form the web of assembled pages 10. When the pneumatic cylinders 274 of the upstream and downstream support structure 238 and 240 secure the sheets 12 upstream from the web of assembled pages 10 as well as the web of assembled pages 10, then downstream movement of the transfer carriage 234 results in the web of sheets 10 and tape 16 and 18 being conveyed downstream through the machine. At the same time, the sheet 12 within the registration station 102 which is to be assembled with the tape 16 and 18 at the trailing end of the web is conveyed downstream into the compression station 104.

Figure 12:
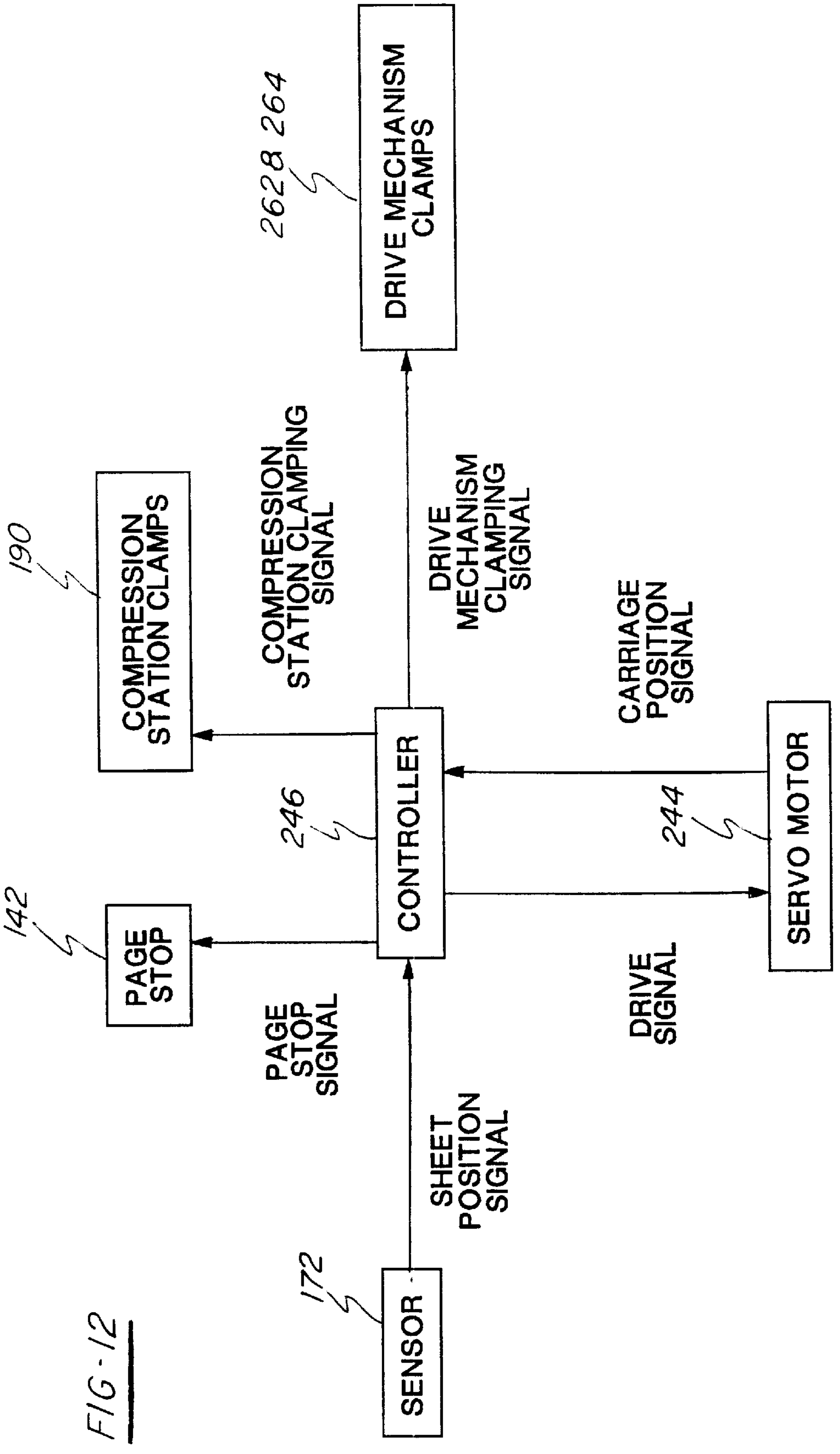
FIG. 12 is a block diagram illustrating the control system of the present invention.
Figure 13:
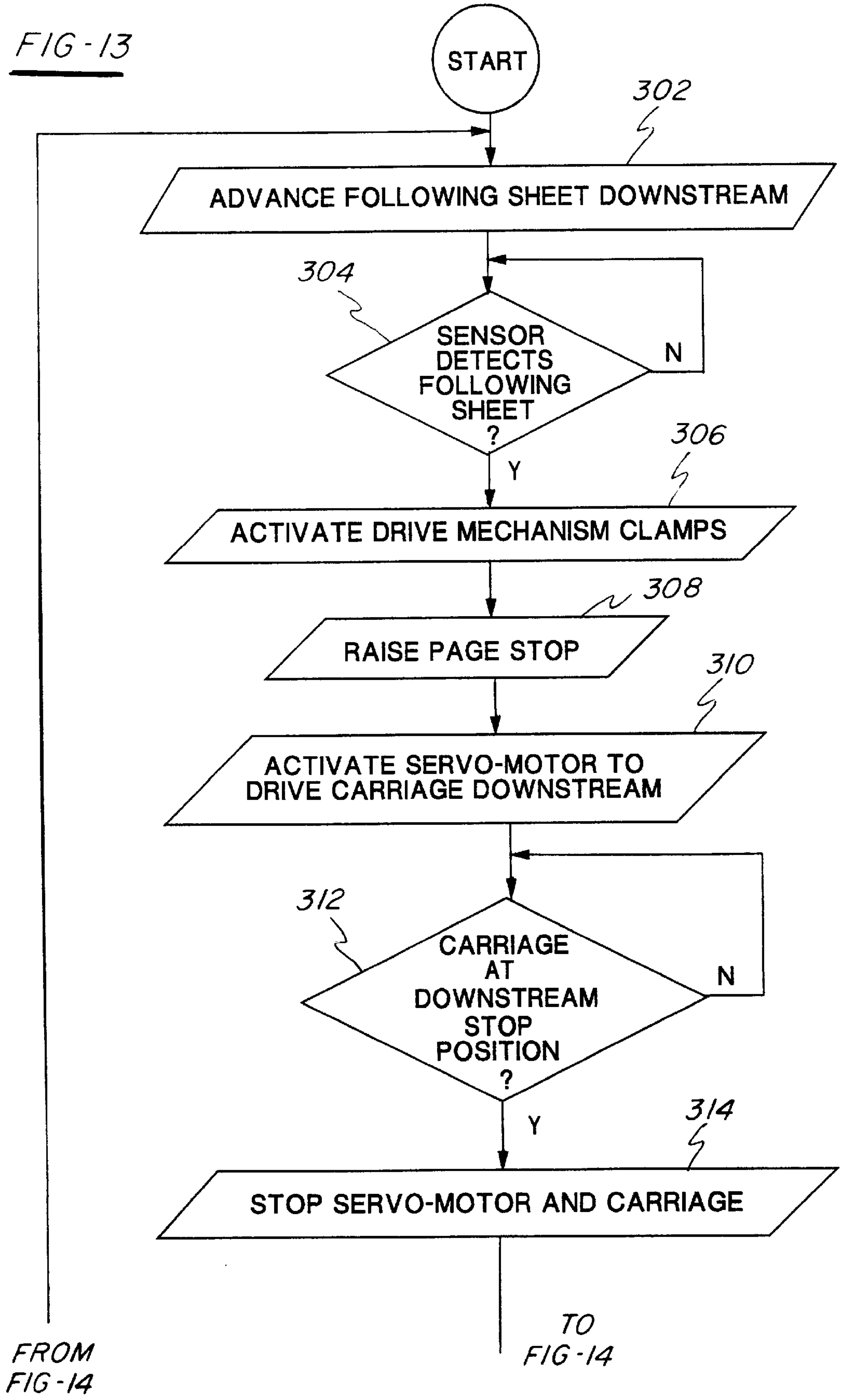
FIG. 13 and 14 are flow charts representing the programming logic of the controller of the apparatus of the present invention.
Figure 14:
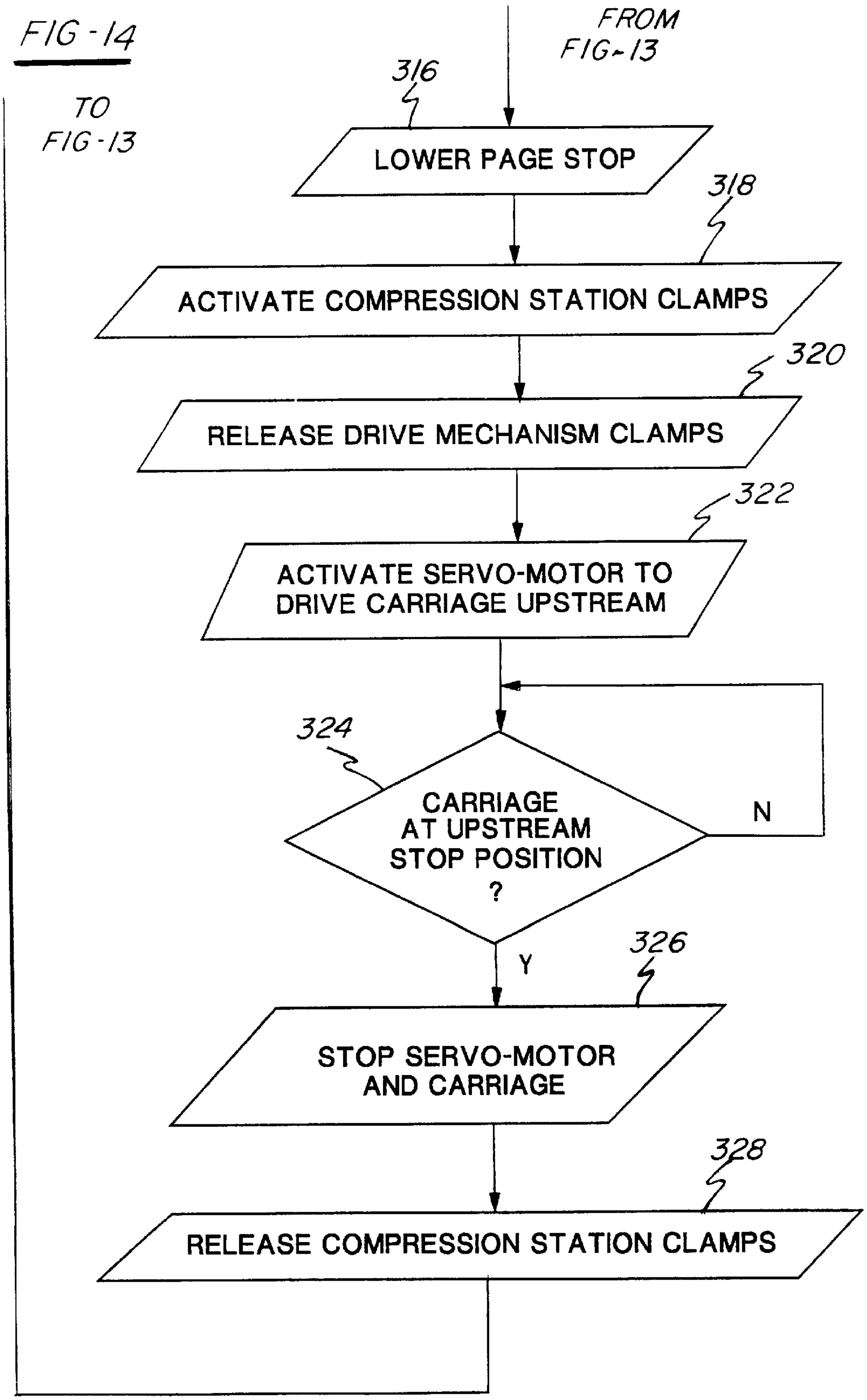

With reference now to FIGS. 12–14, the operation of the apparatus of the present invention will be described in greater detail. As a convenient starting point for the description of the operation of the apparatus of the present invention, it will be assumed that the transfer carriage 234 has returned to an upstream position and is awaiting its next feeding stroke. In such a position, the pneumatic cylinders 274 supported on the upstream and downstream support structures 238 and 240 are in a deactivated state such that engagement surfaces 270 and 272 of the upper and lower clamping shoes 266 and 268 are not engaging nor clamping the base sheet 12 or web of assembled pages 10.

As a base sheet 12 is advanced towards the registration station 102 from the sheet loading station 108, the sensor 172 is actively monitoring the location adjacent to and immediately upstream from the page stop 142, as indicated by blocks 302 and 304 in FIG. 13. Upon detecting the following sheet 12, the sensor 172 sends a sheet position signal to the controller 246 which then activates the pneumatic cylinders 274 on the transfer carriage 234 at block 306 in FIG. 13. As described above, the sheet 12 within the registration station 102 and the web of album pages 10 are thereby clamped to the carriage 234.

At block 308, the controller activates the pneumatic cylinder 160 to raise the stop arm 158 of the page stop. Next, at block 310, the controller 246 activates the servo-motor driven linear actuator 244 to drive the transfer carriage 234 downstream. Since the following sheet 12 and the web of assembled pages 10 are clamped to the transfer carriage 234, the web of assembled pages 10 is conveyed downstream along with the pair of tapes 14 and 16. Likewise, the following sheet 12 immediately upstream from the web of pages 10 is drawn longitudinally in a downstream direction until its leading corners 22 engage the converging tapes 16 and 18 as the tapes reach the tape bend bar 114 and precompression device 126. This following base sheet 12 is conveyed to a point where its leading edge is received within the releasable clamping means 190 of the compression station 102 such that this sheet 12 is secured within the compression station 102 upon activation of the clamping means 190.

Referring now to block 312 of FIG. 13, once the servo motor driven linear actuator 244 determines that the carriage 234 is at a predetermined downstream stop position, a carriage position signal is communicated to the controller 246 which, in turn, sends a drive signal to the servo motor 244 to stop the servo motor 244 and carriage 234 (block 314). The controller 246 at block 316 sends a page stop signal to the pneumatic cylinder 160 causing the stop arm 158 to lower and thereby stopping the next following sheet 12 advancing towards the registration station 102. The controller 246 at block 318 sends a compression station clamping signal which activates the compression station clamping means 190 thereby folding the tapes 16 and 18 into adhering relation with opposite side edges of the base sheet 12. The controller 246 next sends a drive mechanism clamping signal to the drive mechanism clamps at block 320 thereby releasing the drive mechanism clamps 202 and 264 from the following sheet 12 and the web of assembled pages 10.

At block 322, the controller 246 sends a drive signal to the servo motor 244 to drive the transfer carriage 234 upstream to its initial upstream position. When the servo motor 244 determines that the transfer carriage 234 is at its upstream stop position, as represented by block 324, it sends a carriage position signal to the controller 246. Upon receiving the carriage position signal, the controller 246 sends a drive signal to the servo motor 244 to stop its continued upstream movement as indicated by block 326 in FIG. 14. The controller 246 at block 328 sends a compression station clamping signal to the compression station means 190 thereby deactivating or releasing the tapes 16 and 18 from therein. At this point, the system returns to its initial position at block 302 where it awaits input from the sensor 172 upon detecting the following sheet 12 advancing towards the page stop 142.

From the foregoing description, it is apparent that the present invention provides a method and apparatus for manufacturing album pages on an automatic continuous basis with minimal human intervention. Furthermore, the apparatus of the present invention is of an efficient and simple design resulting in reduced construction and maintenance costs.

While the method herein described, and the form of apparatus for carrying this method into effect, constitutes a preferred embodiment of this invention, it is to be understood that the invention is not limited to this precise method and form of apparatus, and that changes may be made in either without departing from the scope of the invention which is defined in the appended claims.

What is claimed is:

1. An apparatus for manufacturing, on an automatic continuous basis, successive album pages of predetermined length and width each of which comprises a base sheet having reinforcing tapes bound thereto in overlapping relation with opposing side edges thereof, said apparatus comprising:

registration station for guiding a pair of tapes in proper laterally spaced relation to receive a sheet therebetween, said registration station including folding means for folding the pair of tapes into overlapping adhered relation with respective side edges of the sheet;

a compression station positioned downstream from said registration station and including a pair of releasable clamps having engagement surfaces aligned above and below the pair of tapes and an actuator operably connected to each said releasable clamp wherein activation of said actuator forces said engagement surfaces into compressing relationship with the pair of tapes thereby completing the folding of the pair of tapes and adhesion thereof with respective side edges of the sheet; and a drive mechanism including an actuator for drawing the sheet and the pair of tapes downstream through said registration and compression stations and thereby drawing additional lengths of the pair of tapes toward said registration station, said drive mechanism further including a sensor for detecting a following sheet immediately upstream from the sheet located within the registration station and producing a signal indicative thereof, and a controller in communication with said sensor and said actuators of said compression station and said drive mechanism, said controller responsive to said signal by selectively controlling said actuators of said compression station and said drive mechanism to form a web comprising a plurality of successive sheets connected with each other by the pair of tapes.

2. The apparatus of claim 1 wherein said registration station further comprises securing means for preventing rotation of the sheet when positioned in said registration station thereby facilitating proper alignment of the sheet with the pair of tapes.

3. The apparatus of claim 2 wherein said securing means comprises a plate having a plurality of apertures, and a vacuum source in fluid communication with said apertures wherein said apertures provide a vacuum pulling the sheet into contact with said plate.

4. The apparatus of claim 1 wherein said folding means comprises a pair of guide members supported on opposing sides of said apparatus, each said guide member having an inner face for receiving and partially folding one of the tapes inwardly toward the sheet along a longitudinal axis.

5. The apparatus of claim 1 wherein said controller deactivates said actuators of said compression station and activates said actuator of said drive mechanism in response to said signal generated from said sensor.

6. The apparatus of claim 1 wherein said drive mechanism further comprises a rail member, and a carriage supported upon said rail member, wherein said actuator of said drive mechanism comprises a servo motor operably connected to said carriage and controlled by said controller wherein said signal generated by said sensor causes said controller to activate said servo motor for linear reciprocating movement of said carriage between an upstream and downstream position.

7. The apparatus of claim 6 wherein said controller is programmable to adjust the length of said movement of said carriage to correspond to sheets of different lengths.

8. The apparatus of claim 6 wherein said drive mechanism further comprises a downstream releasable clamping means for clamping the web to said carriage during movement of said carriage towards said downstream position and releasing the web prior to movement of said carriage towards said upstream position.

9. The apparatus of claim 8 wherein said drive mechanism further comprises an upstream releasable clamping means for clamping the following sheet to said carriage during movement of said carriage towards said downstream position and releasing the following sheet prior to movement of said carriage towards said upstream position.

10. The apparatus of claim 9 wherein each said releasable clamping means comprises a pair of releasable clamps, each said releasable clamp having engagement surfaces aligned above and below one of the sheets, and an actuator operably connected to each said releasable clamp wherein activation of said actuator forces said engagement surfaces into clamping engagement with one of the sheets.

11. The apparatus of claim 9 wherein said upstream releasable clamping means is located upstream from said compression station and said downstream releasable clamping means is located downstream from said compression station.

12. The apparatus of claim 1 wherein said sensor is supported by said compression station upstream from said registration station.

13. The apparatus of claim 1 further comprising a movable page stop for registering the following sheet thereby facilitating a predetermined space between successive sheets in the web.

14. The apparatus of claim 1 wherein said sensor comprises a photosensitive cell for sensing light levels associated with the location of the following sheet and producing a signal indicative thereof.

15. The apparatus of claim 1 wherein said compression station is selectively movable in the longitudinal direction relative to said registration station.

16. An apparatus for manufacturing, on an automatic continuous basis, successive album pages of predetermined length and width each of which comprises a base sheet having reinforcing tapes bound thereto in overlapping relation with opposing side edges thereof, said apparatus comprising:

a registration station for guiding a pair of tapes in proper laterally spaced relation to receive a sheet therebetween, said registration station including folding means for folding the pair of tapes into overlapping adhered relation with respective side edges of the sheet;

a compression station positioned downstream from said registration station and including a pair of releasable clamps having engagement surfaces aligned above and below the pair of tapes and an actuator operably connected to each said releasable clamp wherein activation of said actuator forces said engagement surfaces into compressing relationship with the pair of tapes thereby completing the folding of the pair of tapes and adhesion thereof with respective side edges of the sheet; and a drive mechanism for drawing the sheet and the pair of tapes downstream through said registration and compression stations and thereby drawing additional lengths of the pair of tapes toward said registration station, said drive mechanism comprising a sensor for detecting a following sheet immediately upstream from the sheet located within the registration station and producing a signal indicative thereof, a rail member, a carriage supported upon said rail member, a servo motor operably connected to said carriage, a controller in communication with said sensor and said servo motor, said controller responsive to said signal generated by said sensor wherein said signal causes said controller to activate said servo motor for linear reciprocating movement of said carriage between an upstream and a downstream position to form a web comprising a plurality of successive sheets connected with each other by the pair of tapes.

17. The apparatus of claim 16 wherein said drive mechanism further comprises a releasable clamping means for clamping the webs to said carriage during movement of said carriage towards said downstream position and releasing the web prior to movement of said carriage towards said upstream position.

* * * * *